(12) United States Patent
Uchimura et al.

(10) Patent No.: US 12,244,968 B2
(45) Date of Patent: Mar. 4, 2025

(54) PROCESSING APPARATUS, AND PROCESSING METHOD

(71) Applicant: NEC Corporation, Tokyo (JP)

(72) Inventors: Jun Uchimura, Tokyo (JP); Yuji Tahara, Tokyo (JP); Rina Tomita, Tokyo (JP); Yasuyo Kazo, Tokyo (JP)

(73) Assignee: NEC CORPORATION, Tokyo (JP)

( * ) Notice: Subject to any disclaimer, the term of this patent is extended or adjusted under 35 U.S.C. 154(b) by 146 days.

(21) Appl. No.: 17/634,316

(22) PCT Filed: Jul. 27, 2020

(86) PCT No.: PCT/JP2020/028640
§ 371 (c)(1),
(2) Date: Feb. 10, 2022

(87) PCT Pub. No.: WO2021/039229
PCT Pub. Date: Mar. 4, 2021

(65) Prior Publication Data
US 2022/0295016 A1 Sep. 15, 2022

(30) Foreign Application Priority Data
Aug. 30, 2019 (JP) .................................. 2019-157915

(51) Int. Cl.
*H04N 7/18* (2006.01)
*G06Q 10/06* (2023.01)
(Continued)

(52) U.S. Cl.
CPC ............. *H04N 7/181* (2013.01); *G06Q 10/06* (2013.01); *G06T 7/20* (2013.01); *G06T 7/292* (2017.01);
(Continued)

(58) Field of Classification Search
CPC .......... H04N 7/181; H04N 7/183; H04N 7/18; H04N 23/90; H04N 23/61; G06V 20/52;
(Continued)

(56) References Cited

U.S. PATENT DOCUMENTS 11,126,682 B1 * 9/2021 Silverstein .......... G06F 16/4393
2007/0216781 A1 9/2007 Miyanohara
(Continued)

FOREIGN PATENT DOCUMENTS

CN 101094396 A 12/2007
CN 105072425 A 11/2015
(Continued)

OTHER PUBLICATIONS

US Office Action for U.S. Appl. No. 18/235,644, mailed on May 23, 2024.
(Continued)

*Primary Examiner* — Christopher S Kelley
*Assistant Examiner* — Asmamaw G Tarko
(74) *Attorney, Agent, or Firm* — Sughrue Mion, PLLC

(57) ABSTRACT

The present invention provides a processing apparatus (10) including an acquisition unit (11) that acquires a video generated by a surveillance camera, a generation unit (12) that generates a plurality of surveillance target video contents, based on the video, a condition setting unit (13) that sets a surveillant condition required of a surveillant who confirms the surveillance target video content, and a video distribution unit (14) that distributes the surveillance target video content to a terminal apparatus of a surveillant satisfying the surveillant condition.

16 Claims, 19 Drawing Sheets

(51) Int. Cl.
*G06T 7/20* (2017.01)
*G06T 7/292* (2017.01)
*G06T 7/70* (2017.01)
*G06T 11/20* (2006.01)
*G06V 20/40* (2022.01)
*G06V 20/52* (2022.01)
*G06V 40/10* (2022.01)
*G09G 5/14* (2006.01)
*H04N 23/61* (2023.01)
*H04N 23/90* (2023.01)

(52) U.S. Cl.
CPC .............. *G06T 7/70* (2017.01); *G06T 11/206* (2013.01); *G06V 20/44* (2022.01); *G06V 20/46* (2022.01); *G06V 20/52* (2022.01); *G06V 40/10* (2022.01); *G09G 5/14* (2013.01); *H04N 7/18* (2013.01); *H04N 7/183* (2013.01); *H04N 23/61* (2023.01); *H04N 23/90* (2023.01)

(58) Field of Classification Search
CPC ........ G06V 20/46; G06V 20/41; G06V 20/44; G06V 40/10; G09G 5/14; G06Q 10/06; G06T 7/70; G06T 7/20; G06T 7/292; G06T 11/206; G06T 2207/10016; G06T 2207/30196; G06T 2207/30232
USPC ......................................... 348/143, 159, 169
See application file for complete search history.

(56) References Cited

U.S. PATENT DOCUMENTS

| | | | | |
|---|---|---|---|---|
| 2010/0201821 A1* | 8/2010 | Niem | .................... | G06V 40/168 348/E7.085 |
| 2011/0030051 A1* | 2/2011 | Bui | ................ | G06Q 10/063116 726/17 |
| 2015/0110459 A1* | 4/2015 | Reed | ................ | H04N 21/47202 386/223 |
| 2015/0358658 A1* | 12/2015 | Murphy | ................ | H04N 21/854 725/35 |
| 2016/0014133 A1* | 1/2016 | Kanga | .................... | G06V 20/46 726/4 |
| 2018/0025175 A1 | 1/2018 | Kato | | |
| 2018/0350213 A1* | 12/2018 | Bart | ..................... | G06T 7/0002 |
| 2019/0163966 A1 | 5/2019 | Moriya | | |
| 2019/0236374 A1* | 8/2019 | Nakagawa | ............. | G06V 20/46 |
| 2019/0332856 A1* | 10/2019 | Sato | ........................ | G06V 20/52 |
| 2019/0386976 A1* | 12/2019 | Weerasuriya | ........... | H04L 67/12 |
| 2020/0005231 A1* | 1/2020 | Nakagawa | ........... | G06Q 20/208 |
| 2020/0090701 A1* | 3/2020 | Xu | ..................... | H04N 21/2743 |
| 2020/0258550 A1* | 8/2020 | Seki | ........................ | G06V 20/46 |
| 2020/0394395 A1* | 12/2020 | Ong | ........................ | G06V 40/161 |
| 2022/0036081 A1* | 2/2022 | Ong | ........................ | G06V 20/52 |
| 2022/0148315 A1* | 5/2022 | Blott | ........................ | G06V 20/52 |
| 2022/0343743 A1 | 10/2022 | Uchimura et al. | | |

FOREIGN PATENT DOCUMENTS

| | | |
|---|---|---|
| JP | 2006-330922 A | 12/2006 |
| JP | 2007-318333 A | 12/2007 |
| JP | 2008-059523 A | 3/2008 |
| JP | 2011-018094 A | 1/2011 |
| JP | 2015-070401 A | 4/2015 |
| JP | 2018-061213 A | 4/2018 |
| WO | 2018/096787 | 5/2018 |
| WO | 2018/163547 A1 | 9/2018 |

OTHER PUBLICATIONS

International Search Report for PCT Application No. PCT/JP2020/028640, mailed on Oct. 13, 2020.
Akabayashi Takahito, "Principle and Application of New Face Authentication Software Development Kit 'NeoFace'", NEC Technical Journal, Nov. 25, 2003, vol. 56, No. 10, pp. 57-60, ISSN 0285-4139.
Japanese Office Communication for JP Application No. 2021-542643 mailed on May 14, 2024 with English Translation.
CN Office Action for CN Application No. 202080059425.3, mailed on Sep. 24, 2024 with English Translation.

* cited by examiner

FIG. 9

| SURVEILLANCE TARGET VIDEO CONTENT DISCRIMINATION INFORMATION | FILE NAME | PERSON CHARACTER-ISTIC | CAPTURING PLACE | CAPTURING DATE AND TIME | VIDEO TIME | SURVEILLANT CONDITION | ... |
|---|---|---|---|---|---|---|---|
| C0013132 | xxx.mp4 | MALE FORTIES... | AA MART xx BRANCH | 2019.8.7 13:01:00~13:03:18 | 2:18 | *** | ... |
| ... | ... | ... | ... | ... | ... | ... | ... |

FIG. 10

| SURVEILLANCE TARGET VIDEO CONTENT DISCRIMINATION INFORMATION | INDEX | PERSON CHARACTER-ISTIC | CAPTURING PLACE | CAPTURING DATE AND TIME | VIDEO TIME | SURVEILLANT CONDITION | ... |
|---|---|---|---|---|---|---|---|
| C0013132 | F001[0:01:28~0:02:32]→F003 [0:03:14~0:04:28] | MALE, FORTIES, .... | AA MART xx BRANCH | 2019.8.7 13:01:00~13:03:18 | 2:18 | * * * | ... |
| ... | ... | ... | ... | ... | ... | ... | ... |

FIG. 11

| FACILITY DISCRIMINATION INFORMATION (CAPTURING PLACE) | SURVEILLANT CONDITION |
|---|---|
| AA MART ×× BRANCH | * * * |
| ⋮ | ⋮ |

FIG. 14

| SURVEILLANT DISCRIMINATION INFORMATION | JOB EXPERIENCE | EVALUATION | RECEPTION HISTORY | | | CAREER | PREVIOUS JOB DATE | ... |
|---|---|---|---|---|---|---|---|---|
| | | | A | B | ... | | | |
| P3132 | TWO YEARS AND ONE MONTH | 3.9/5.0 | ○ | × | ... | AA MART ... | 2019.6.13 | ... |
| .... | .... | .... | .... | .... | .... | .... | .... | .... |

FIG. 16

| REPORT DISCRIMINATION INFORMATION | SURVEILLANCE REPORT | SURVEILLANT DISCRIMINATION INFORMATION | INPUT DATE AND TIME | ... |
|---|---|---|---|---|
| R0012 | ・・・・<br>・・・・ | P3132 | 2019.06.13<br>13:12:18 | ... |
| ⋮ | ⋮ | ⋮ | ⋮ | ⋮ |

PROCESSING APPARATUS, AND PROCESSING METHOD

This application is a National Stage Entry of PCT/JP2020/028640 filed on Jul. 27, 2020, which claims priority from Japanese Patent Application 2019-157915 filed on Aug. 30, 2019, the contents of all of which are incorporated herein by reference, in their entirety.

TECHNICAL FIELD

The present invention relates to a processing apparatus, a processing system, a processing method, and a program.

BACKGROUND ART

Patent Document 1 discloses a technique of registering, in a database, information relating to an in-house worker and information relating to an outside worker, and a condition for allocating work to either the in-house worker or the outside worker according to a work content, and determining, when there is a work allocation request, a worker, based on information relating to a content of work that allocation request work has and the condition.

Patent Document 2 discloses a technique of detecting, based on an image of a product shelf, that a product has been taken, and outputting time-series data of images from a point of the detection to a predetermined past point.

RELATED DOCUMENT

Patent Document

[Patent Document 1] Japanese Patent Application Publication No. 2008-59523
[Patent Document 2] International Publication No. WO2018/163547

DISCLOSURE OF THE INVENTION

Technical Problem

In recent years, a large number of surveillance cameras are placed in every facility including a retail store such as a convenience store, an airport, a station, and the like. In order to confirm, without overlooking, a large number of videos generated by a large number of surveillance cameras, it is necessary to secure a large number of surveillants who confirm a video.

However, for example, in a case of a system in which a video generated by a surveillance camera is reproduced at a fixed place such as a center, and a surveillant confirms the video at the place, it becomes difficult to secure a surveillant due to a limit of a place or a time. Neither Patent Document 1 nor 2 describes or suggests the problem and a solving means thereof.

The present invention has a problem of providing a technique for facilitating to secure a surveillant who confirms a video generated by a surveillance camera.

Solution to Problem

The present invention provides a processing apparatus including:
an acquisition means for acquiring a video generated by a surveillance camera;
a generation means for generating a plurality of surveillance target video contents, based on the video;
a condition setting means for setting a surveillant condition required of a surveillant who confirms the surveillance target video content; and
a video distribution means for distributing the surveillance target video content to a terminal apparatus of a surveillant satisfying the surveillant condition.

Moreover, the present invention provides a processing apparatus including:
an acquisition means for acquiring a video generated by a surveillance camera;
a condition setting means for setting a surveillant condition required of a surveillant who confirms the video; and
a video distribution means for distributing the video to a terminal apparatus of a surveillant satisfying the surveillant condition.

Moreover, the present invention provides a processing method including:
by a computer,
acquiring a video generated by a surveillance camera;
generating a plurality of surveillance target video contents, based on the video;
setting a surveillant condition required of a surveillant who confirms the surveillance target video content; and
distributing the surveillance target video content to a terminal apparatus of a surveillant satisfying the surveillant condition.

Moreover, the present invention provides a program causing a computer to function as
an acquisition means for acquiring a video generated by a surveillance camera,
a generation means for generating a plurality of surveillance target video contents, based on the video,
a condition setting means for setting a surveillant condition required of a surveillant who confirms the surveillance target video content, and
a video distribution means for distributing the surveillance target video content to a terminal apparatus of a surveillant satisfying the surveillant condition.

Moreover, the present invention provides a processing method including:
by a computer,
acquiring a video generated by a surveillance camera;
setting a surveillant condition required of a surveillant who confirms the video; and
distributing the video to a terminal apparatus of a surveillant satisfying the surveillant condition.

Moreover, the present invention provides a program causing a computer to function as
an acquisition means for acquiring a video generated by a surveillance camera,
a condition setting means for setting a surveillant condition required of a surveillant who confirms the video, and
a video distribution means for distributing the video to a terminal apparatus of a surveillant satisfying the surveillant condition.

Moreover, the present invention provides a processing system including:
acquiring a video generated by a surveillance camera;
generating a plurality of surveillance target video contents, based on the video;
setting a surveillant condition required of a surveillant who confirms the surveillance target video content; and distributing the surveillance target video content to a terminal apparatus of a surveillant satisfying the surveillant condition.

Advantageous Effects of Invention

The present invention achieves a technique for facilitating to secure a surveillant who confirms a video generated by a surveillance camera.

BRIEF DESCRIPTION OF THE DRAWINGS

FIG. 9 is a diagram schematically illustrating one example of information processed by the processing apparatus according to the present example embodiment.

FIG. 10 is a diagram schematically illustrating one example of information processed by the processing apparatus according to the present example embodiment.

FIG. 11 is a diagram schematically illustrating one example of information processed by the processing apparatus according to the present example embodiment.

FIG. 14 is a diagram schematically illustrating one example of information processed by the processing apparatus according to the present example embodiment.

FIG. 16 is a diagram schematically illustrating one example of information processed by the processing apparatus according to the present example embodiment.

DESCRIPTION OF EMBODIMENTS

First Example Embodiment

"Full View and Outline of a Surveillance System"

Figure 1:
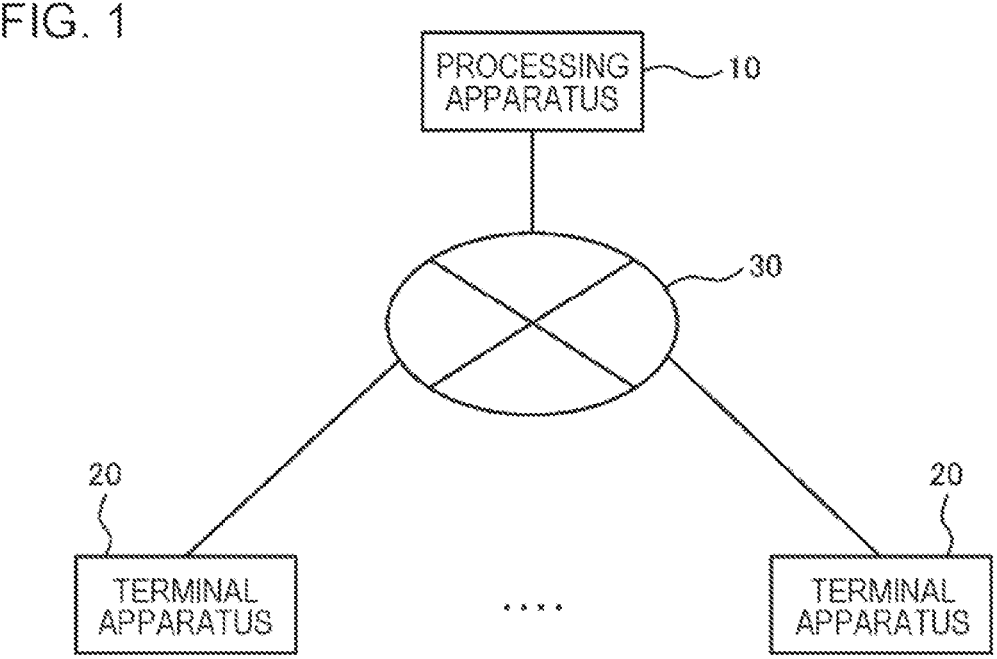
FIG. 1 is one example of a functional block diagram of a surveillance system according to the present example embodiment.

First, a full view and an outline of a surveillance system according to the present example embodiment are described by use of FIG. 1. The surveillance system includes a processing apparatus 10 and a plurality of terminal apparatuses 20. The processing apparatus 10 and each of the terminal apparatuses 20 are communicable with each other via a communication network 30.

The terminal apparatus 20 is a terminal owned by a surveillant who confirms a video generated by a surveillance camera, and, for example, is equivalent to a portable terminal such as a smartphone, a tablet terminal, a notebook personal computer (PC), or a mobile phone, a stationary PC, or the like.

The processing apparatus 10 is an apparatus managed by an enterprise that is under a contract with a surveillant, and that provides a video generated by a surveillance camera to the surveillant and causes the surveillant to confirm the video. The enterprise may be an enterprise that manages a facility such as a retail store, an airport, or a station in which a surveillance camera is placed, may be an enterprise that is under a contract with a plurality of facilities, and that provides a service of confirming a video generated by a surveillance camera placed in each of the facilities, or may be any other enterprise.

Note that, in the present example embodiment, a surveillant does not confirm, in real time, a video generated by a surveillance camera, but later confirm a video generated by a surveillance camera. In other words, a surveillant confirms a video not for a purpose of sensing, in real time, but for a purpose of later sensing a trouble or the like occurring in a facility.

The processing apparatus 10 has a function of acquiring a video generated by a surveillance camera, a function of generating a surveillance target video content, based on the video, a function of setting a surveillant condition required of a surveillant who confirms each surveillance target video content, and a function of distributing each surveillance target video content to the terminal apparatus 20 of a surveillant satisfying each surveillant condition.

For example, a surveillant operates the terminal apparatus 20 of his/her own, and performs an input of performing a job of confirming a surveillance target video content, at any timing and in any place. Accordingly, the processing apparatus 10 distributes, to the terminal apparatus 20 operated by the surveillant, a surveillance target video content for which a surveillant condition satisfied by the surveillant is set. The surveillant confirms (views) the surveillance target video content displayed on the terminal apparatus 20, and inputs a point that the surveillant has noticed, if any, to the terminal apparatus 20. Accordingly, the terminal apparatus 20 transmits an input content to the processing apparatus 10.

In this way, with the surveillance system according to the present example embodiment, a surveillant can perform a job of confirming a surveillance target video content, at any timing and in any place. Since a degree of freedom of place and time for performing a job is great in this way, it becomes easy to secure a surveillant.

Moreover, a surveillant condition required of a surveillant who confirms each surveillance target video content can be set, and each surveillance target video content can be distributed to the terminal apparatus 20 of a surveillant satisfying each surveillance condition. Thus, work of confirming each surveillance target video content can be controlled in such a way that an appropriate surveillant performs the work.

"Configuration of the Processing Apparatus 10"

Next, a configuration of the processing apparatus 10 is described in detail. First, one example of a hardware configuration of the processing apparatus 10 is described. Each functional unit included in the processing apparatus 10 is achieved by any combination of hardware and software mainly including a central processing unit (CPU) of any computer, a memory, a program loaded onto the memory, a storage unit such as a hard disk that stores the program (that can store not only a program previously stored from a phase of shipping an apparatus but also a program downloaded from a storage medium such as a compact disc (CD) or a server or the like on the Internet), and an interface for network connection. Then, it is appreciated by a person skilled in the art that there are a variety of modified examples of a method and an apparatus for the achievement.

Figure 2:
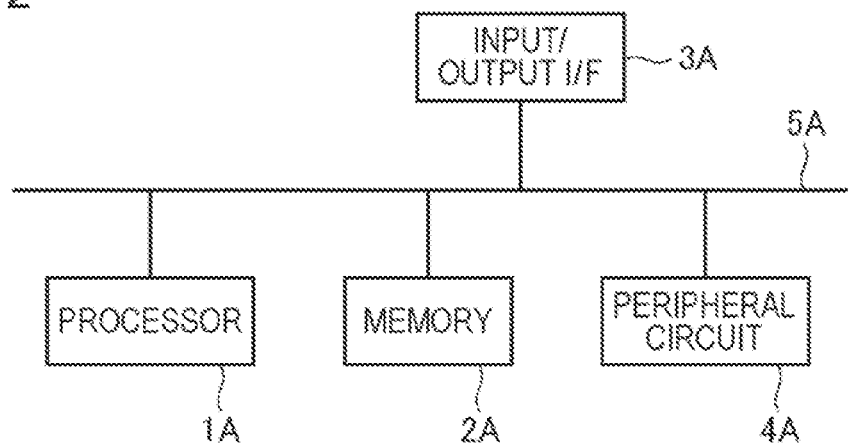
FIG. 2 is a diagram illustrating one example of a hardware configuration of a processing apparatus according to the present example embodiment.

FIG. 2 is a block diagram illustrating a hardware configuration of the processing apparatus 10. As illustrated in FIG. 2, the processing apparatus 10 includes a processor 1A, a memory 2A, an input/output interface 3A, a peripheral circuit 4A, and a bus 5A. The peripheral circuit 4A includes various modules. Note that, the processing apparatus 10 may not include the peripheral circuit 4A. Note that, the processing apparatus 10 may be configured by one physically and/or logically integrated apparatus, or may be configured by a plurality of physically and/or logically separated apparatuses. When the processing apparatus 10 is configured by a plurality of physically and/or logically separated apparatuses, each of the plurality of apparatuses can include the hardware configuration described above.

The bus 5A is a data transmission path for the processor 1A, the memory 2A, the peripheral circuit 4A, and the input/output interface 3A to mutually transmit and receive data. The processor 1A is, for example, an arithmetic processing apparatus such as a CPU and a graphics processing unit (GPU). The memory 2A is, for example, a memory such as a random access memory (RAM) and a read only memory (ROM). The input/output interface 3A includes an interface for acquiring information from an input apparatus, an external apparatus, an external server, an external sensor, a camera, and the like, an interface for outputting information to an output apparatus, an external apparatus, an external server, and the like, and the like. The input apparatus is, for example, a keyboard, a mouse, a microphone, a touch panel, a physical button, a camera, and the like. The output apparatus is, for example, a display, a speaker, a printer, a mailer, and the like. The processor 1A can give an instruction to each of modules, and perform an arithmetic operation, based on an arithmetic result of each of the modules.

Figure 3:
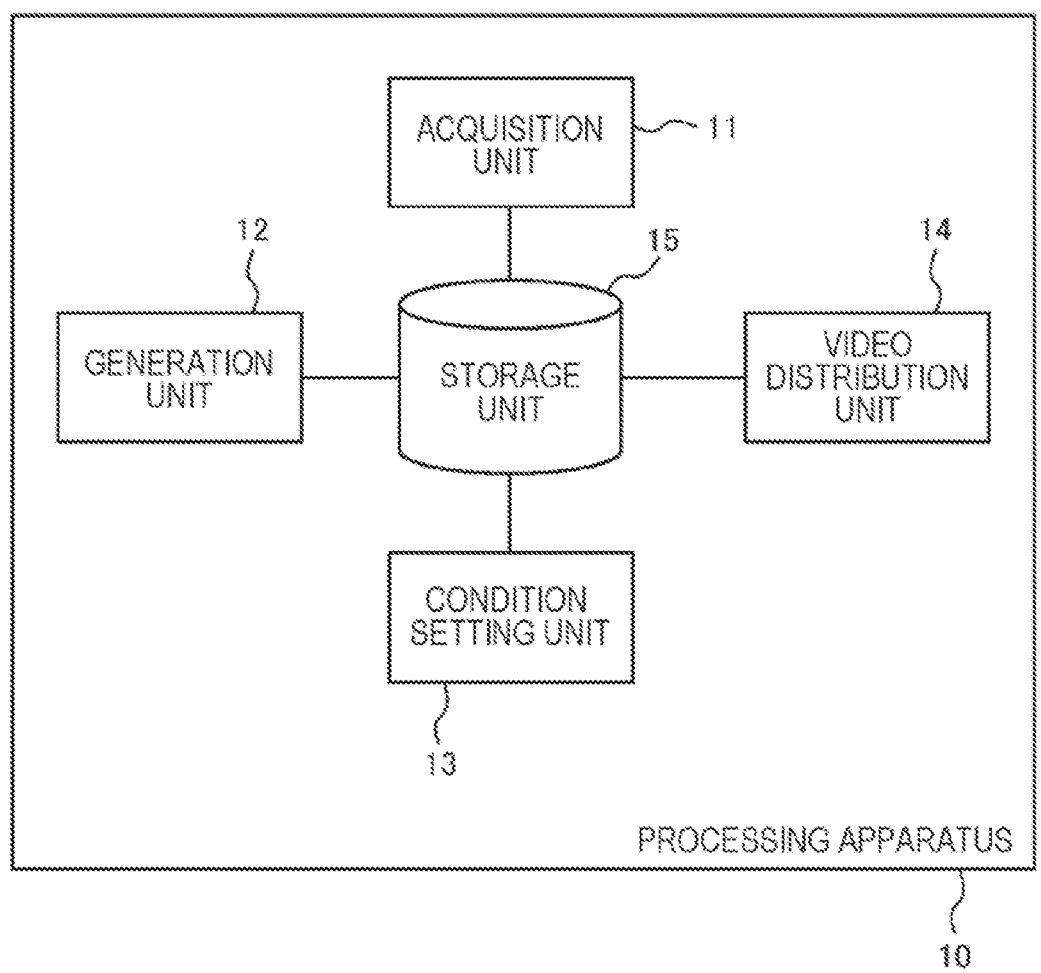
FIG. 3 is one example of a functional block diagram of the processing apparatus according to the present example embodiment.

Next, a functional configuration of the processing apparatus 10 is described. FIG. 3 illustrates one example of a functional block diagram of the processing apparatus 10. As illustrated, the processing apparatus 10 includes an acquisition unit 11, a generation unit 12, a condition setting unit 13, a video distribution unit 14, and a storage unit 15. Note that, the processing apparatus 10 may not include the storage unit 15. In this case, another apparatus configured communicably with the processing apparatus 10 includes the storage unit 15.

The processing apparatus 10 according to the present example embodiment has a "function of generating a surveillance target video content", and a "function of distributing a surveillance target video content". The functional configuration of the processing apparatus 10 is described below separately into the two functions.

"Function of Generating a Surveillance Target Video Content"

Figure 4:
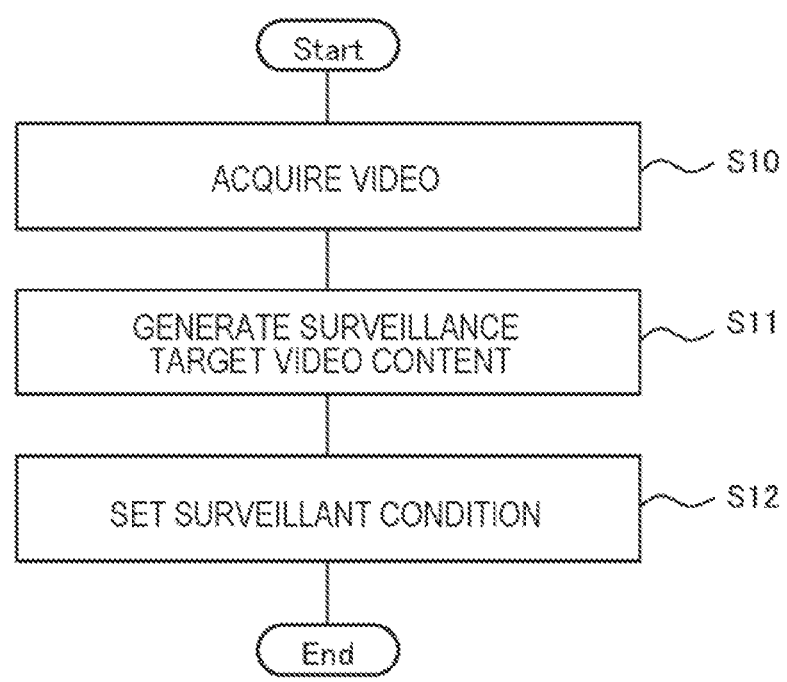
FIG. 4 is a flowchart illustrating one example of a flow of processing of the processing apparatus according to the present example embodiment.

One example of a flow of processing of the function is illustrated in FIG. 4. When acquiring a video generated by a surveillance camera (S10), the processing apparatus 10 generates a surveillance target video content, based on the video (S11), and sets a surveillant condition for the generated surveillance target video content. Detailed description is given below.

In S10, the acquisition unit 11 acquires a video (video file) generated by a surveillance camera. The acquisition unit 11 can acquire a plurality of videos generated by a plurality of surveillance cameras. In the present example embodiment, the acquisition unit 11 may acquire, by real-time processing, a video generated by a surveillance camera, or may acquire, by batch processing, a video generated by a surveillance camera. When acquiring by batch processing, what timing to acquire is a matter of design.

Note that, the acquisition unit 11 may acquire a video generated by one or a plurality of surveillance cameras placed in one facility, or may acquire a video generated by one or a plurality of surveillance cameras placed in each of a plurality of facilities. When acquiring a video generated by one or a plurality of surveillance cameras placed in each of a plurality of facilities, videos generated by one or a plurality of surveillance cameras placed in the same facility are grouped, and are distinguishable from a video generated by a surveillance camera placed in another facility. For example, group information associating discrimination information (example: a file name) of each video with discrimination information of a group to which each video belongs may be generated, and stored in the storage unit 15, or the group may be managed by another means.

Next, in S11, the generation unit 12 generates a plurality of surveillance target video contents, based on the video acquired by the acquisition unit 11.

Generation Example 1

Figure 5:
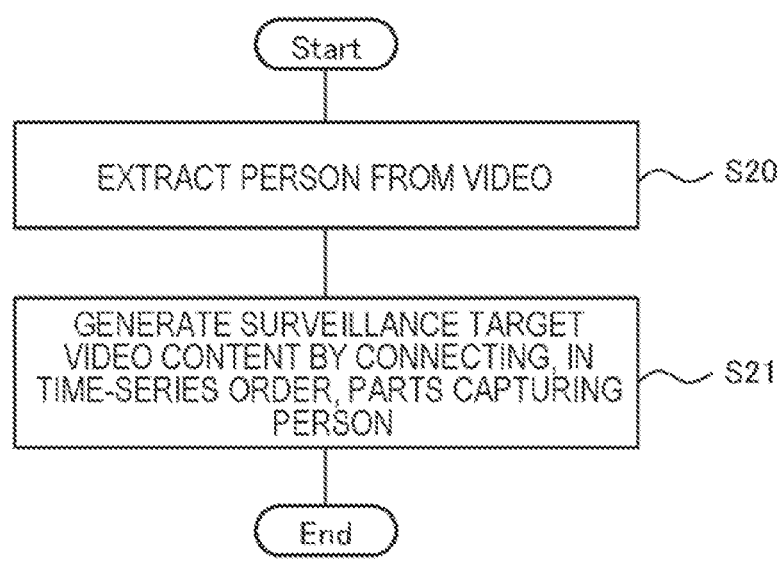
FIG. 5 is a flowchart illustrating one example of a flow of processing of the processing apparatus according to the present example embodiment.

A first example of generating a surveillance target video content is described by use of a flowchart in FIG. 5.

In the example, the generation unit 12 extracts a person from a video (S20), and generates a surveillance target video content connecting, in a time-series order, parts capturing the person (i.e., excluding parts that do not capture the person) (S21).

Consequently, a surveillance target video content in which only a part capturing a person can be efficiently confirmed is generated. In this case, for example, a surveillance target video content may be generated for each video file acquired by the acquisition unit 11.

Figure 6:
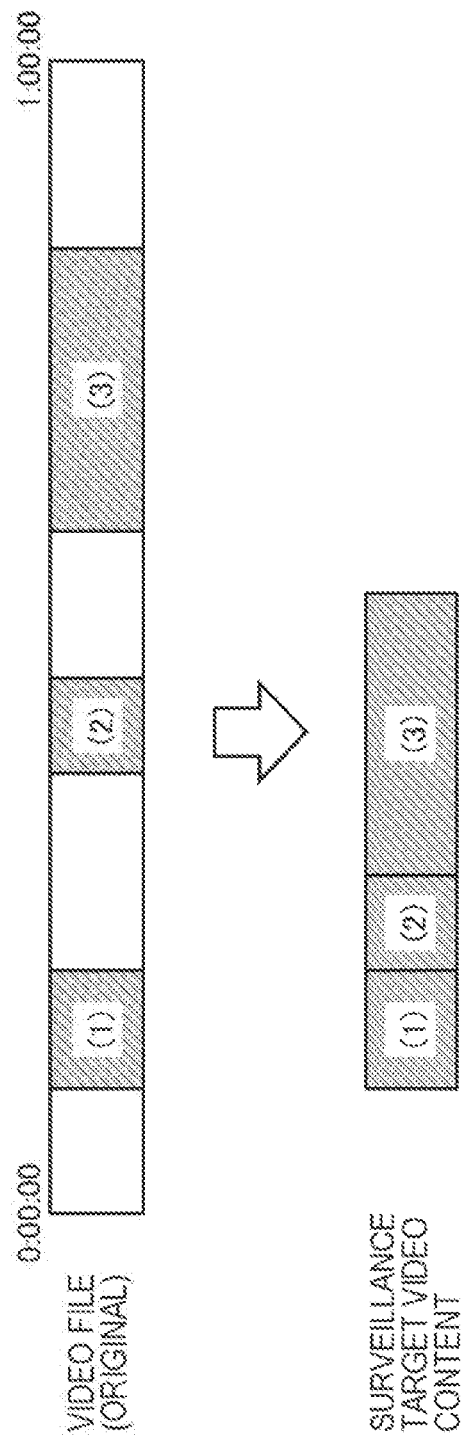
FIG. 6 is a diagram for describing processing of generating a surveillance target video content according to the present example embodiment.

A conceptual diagram of the processing is illustrated in FIG. 6. The diagram illustrates an original video file (a video file acquired by the acquisition unit 11), and a surveillance target video content generated in relation to the video file. Parts of (1) to (3) in the original video file are parts capturing a person. The surveillance target video content is generated by connecting the parts of (1) to (3) in a time-series order.

The generation unit 12 may generate a video file connecting parts capturing a person in a time-series way, in addition to an original video file. Alternatively, the generation unit 12 may generate index data indicating a part capturing a person in an original video file, for example, by an elapsed time from a beginning.

Note that, the generation unit 12 may determine whether an extracted person is a target requiring surveillance, and generate a surveillance target video content connecting, in a time-series order, parts capturing the person determined as a target requiring surveillance (i.e., not including a part only capturing a person who is not determined as a target requiring surveillance).

Herein, processing of determining whether an extracted person is a target requiring surveillance is described. For example, the generation unit 12 may regard, as a target requiring surveillance, a person whose person characteristic estimated by an image analysis does not satisfy an elimination condition. For example, the generation unit 12 may estimate an age (person characteristic) of an extracted person. Then, an elimination condition may be "an estimated age is less than 10".

Note that, the generation unit 12 may regard, as a target requiring surveillance, a person whose person characteristic estimated by an image analysis satisfies a target condition. For example, the generation unit 12 may estimate an age (person characteristic) of an extracted person. Then, a target condition may be "an estimated age is equal to or more than 11".

Alternatively, the generation unit 12 may regard, as a target requiring surveillance, a person whose feature extracted from an image satisfies a surveillance requirement. For example, when a facility in which a surveillance camera is placed is a retail store, the generation unit 12 may extract, as a feature of a person, whether the person carries a briefcase. Then, a surveillance requirement may be "carrying a briefcase" (shoplifting measure).

Alternatively, a person performing a suspicious action in the past, or the like may be previously registered in a blacklist as a target requiring surveillance. In the blacklist, a feature of appearance of each registered person is registered. Then, the generation unit 12 may determine, as a target requiring surveillance, a person registered in the blacklist among extracted persons.

Generation Example 2

Figure 7:
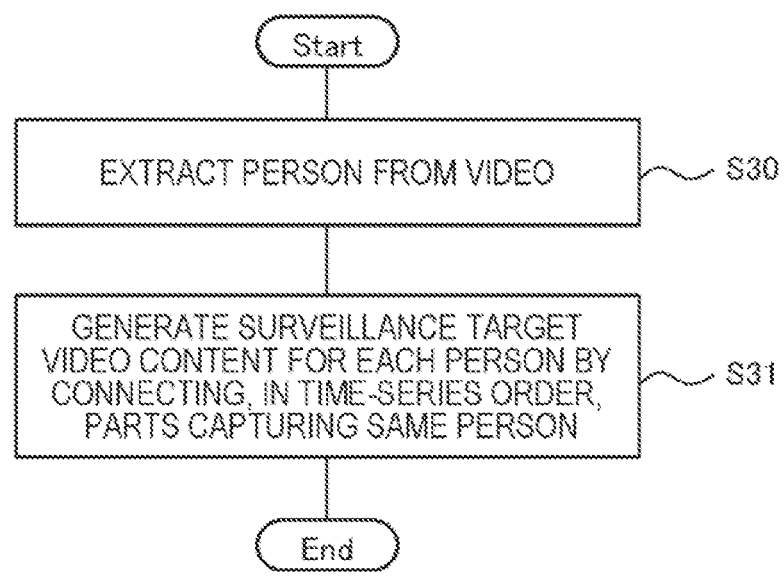
FIG. 7 is a flowchart illustrating one example of a flow of processing of the processing apparatus according to the present example embodiment.

A second example of generating a surveillance target video content is described by use of a flowchart in FIG. 7.

In the example, the generation unit 12 extracts a person from a video (S30), and generates, for each extracted person, a plurality of surveillance target video contents connecting, in a time-series order, parts capturing each person (S31).

Consequently, a surveillance target video content in which only a part capturing each person can be efficiently confirmed is generated for each extracted person. In this case, a surveillance target video content is generated for each extracted person.

Note that, the generation unit 12 may extract a person from a plurality of videos generated by each of a plurality of surveillance cameras placed in the same facility, and generate a surveillance target video content connecting, in a time-series order, parts capturing the same person.

Figure 8:
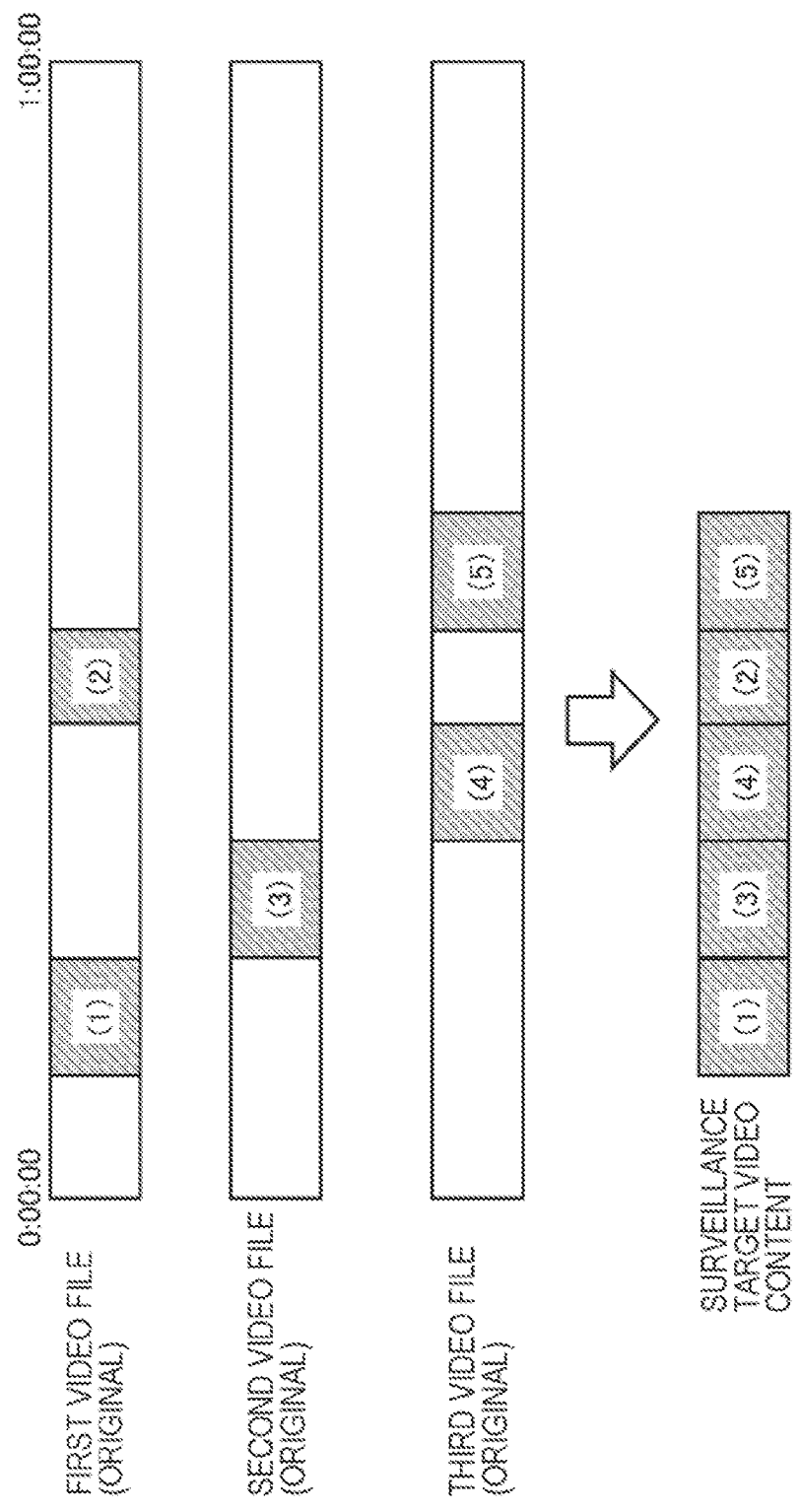
FIG. 8 is a diagram for describing processing of generating a surveillance target video content according to the present example embodiment.

A conceptual diagram of the processing is illustrated in FIG. 8. The diagram illustrates three original video files (video files acquired by the acquisition unit 11), and a surveillance target video content generated in relation to each of the video files. A first original video file is a video file generated by a first surveillance camera, a second original video file is a video file generated by a second surveillance camera, and a third original video file is a video file generated by a third surveillance camera. The first to third surveillance cameras are placed in the same facility.

Parts of (1) and (2) in the first original video file are parts capturing a person A, a part of (3) in the second original video file is a part capturing the person A, and parts of (4) and (5) in the third original video file are parts capturing the person A. The surveillance target video content is generated by connecting the parts of (1) to (5) in a time-series order.

The generation unit 12 may generate a video file connecting parts capturing each person in a time-series way, in addition to an original video file. Alternatively, the generation unit 12 may generate index data indicating a part capturing each person in an original video file, for example, by an elapsed time from a beginning.

Note that, the generation unit 12 may determine whether an extracted person is a target requiring surveillance, and generate a surveillance target video content for each person determined as a target requiring surveillance. In other words, the generation unit 12 may not generate a surveillance target video content of a person who is not determined as a target requiring surveillance. Processing of determining whether an extracted person is a target requiring surveillance is as described above.

Processing of extracting a person from a video can be achieved by utilizing any image analysis technique. Moreover, processing of combining, by the same person, a person extracted from a frame image and a person extracted from another frame image can be achieved by utilizing any image analysis technique. For example, persons extracted from frames differing from each other may be combined by the same person, based on a similarity degree of a feature value of appearance of each person extracted from an image, a positional relation of a person between precedent and subsequent frames, or the like, or another technique may be utilized.

By the processing of the generation unit 12 described above, for example, such information as illustrated in FIG. 9 or 10 is generated, and stored in the storage unit 15.

In the information illustrated in FIG. 9, surveillance target video content discrimination information for discriminating surveillance target video contents from each other, a file name of each surveillance target video content, a person characteristic being related to each surveillance target video content, a capturing place of each surveillance target video content, a capturing date and time of each surveillance target video content, a length of each surveillance target video content, and a surveillant condition of each surveillance target video content are related to one another.

The information illustrated in FIG. 10 differs from the information illustrated in FIG. 9 in having index data indicating, by, for example, an elapsed time from a beginning or the like, a part capturing a person in an original video file, instead of a file name of each surveillance target video content. F001 of an illustrated index is discrimination information of an original video file, and [0:01:28 to 0:02:32] is information determining a part (time period) capturing a person by an elapsed time from a beginning of an original video file. In the illustrated index, pieces of such information are arranged in a time-series order.

Returning to FIGS. 3 and 4, in S12, the condition setting unit 13 sets a surveillant condition required of a surveillant who confirms a surveillance target video content. As illustrated in FIGS. 9 and 10, the condition setting unit 13 can set a surveillant condition for each surveillance target video content.

A surveillant condition is defined based on at least one of, for example, an experience of a job of confirming a video, an evaluation of the job performed in the past, whether various trainings relating to the job are received, a past career, and an elapsed time from a previous job performance date. One example of a surveillant condition set for a certain surveillance target video content is indicated below.

"An experience of a job of confirming a video: equal to or more than three years, an evaluation of the job performed in the past: equal to or more than 3.5, surveillance job training is already received, a person having a business experience at a convenience store in the past, and an elapsed time from a previous job performance date: within one year".

For example, as illustrated in FIG. 11, a person in charge at each facility previously registers a surveillant condition required of a surveillant who confirms a video generated by a surveillance camera of a local facility. Then, the registration information is stored in the storage unit 15. The condition setting unit 13 sets a surveillant condition for each surveillance target video content, based on the registration information.

Moreover, although not illustrated, a person in charge at each facility may be able to register a surveillant condition for each of a plurality of cases. For example, a plurality of cases may be defined based on a capturing time period of a video, such as "case 1: 11 p.m. to 7 a.m." and "case 2: 7 a.m. to 11 p.m.", may be defined based on a characteristic of a person captured in a video, such as "case 1: a surveillance target video content being related to a person who is registered in the above-described blacklist", and "case 2: a surveillance target video content being related to a person who is not registered in the above-described blacklist", may be defined based on a capturing day of a week of a video, such as "case 1: Monday to Friday" and "case 2: Saturday and Sunday", or may be defined in another way.

In this way, the condition setting unit 13 can set a surveillant condition for a surveillance target video content, based on at least one of a characteristic of a person captured in a video, a capturing time period of a video, and a capturing place (facility) of a video.

"Function of Distributing a Surveillance Target Video Content"

Returning to FIG. 3, the video distribution unit 14 distributes a surveillance target video content to the terminal apparatus 20 of a surveillant satisfying a surveillant condition.

Distribution Example 1

Figure 12:
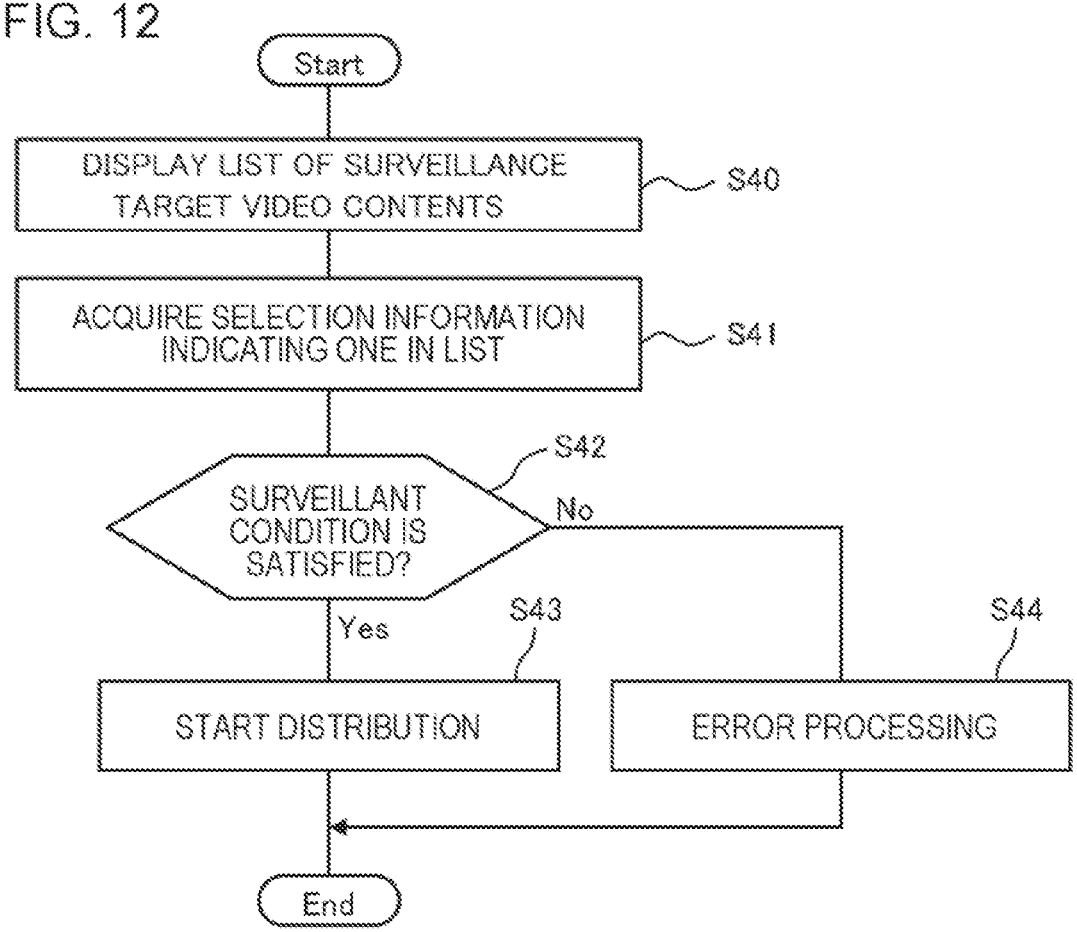
FIG. 12 is a flowchart illustrating one example of a flow of processing of the processing apparatus according to the present example embodiment.

A first example of distributing a surveillance target video content is described by use of a flowchart in FIG. 12.

Figure 13:
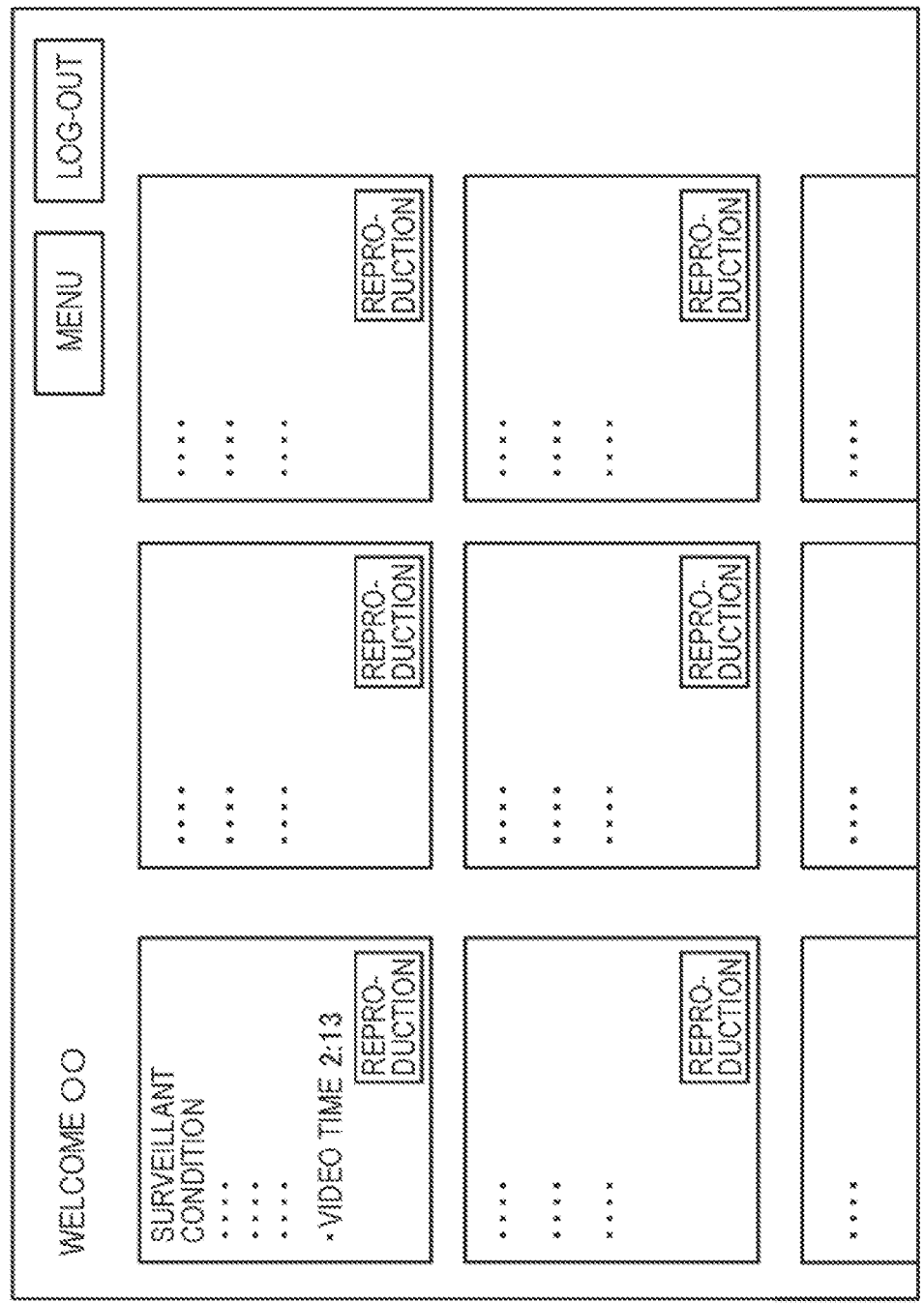
FIG. 13 is a diagram schematically illustrating one example of a screen displayed by a terminal apparatus according to the present example embodiment.

For example, after a first surveillant operates the first terminal apparatus 20 and logs in the processing apparatus 10, the video distribution unit 14 causes the first terminal apparatus 20 to display a list of surveillance target video contents needing confirmation work, as illustrated in FIG. 13 (S40). In an example illustrated in FIG. 13, a surveillant condition, an outline (example: a video time or the like) of each content, and a reproduction button for starting confirmation of a video are displayed for each surveillance target video content.

The first surveillant determines, based on a surveillant condition, an outline of a content, and the like, one surveillance target video content for which confirmation of a video is performed, from the list, and performs an input (example: pressing of the reproduction button) of selecting the surveillance target video content. Accordingly, the first terminal apparatus 20 transmits, to the processing apparatus 10, selection information indicating the selected surveillance target video content.

When acquiring the selection information (S41), the video distribution unit 14 determines whether the first surveillant being associated with the first terminal apparatus 20 satisfies a surveillant condition of a surveillance target video content determined by the selection information (S42).

For example, as illustrated in FIG. 14, information of each of a plurality of surveillants is previously stored in the storage unit 15. The illustrated information relates, to one another, surveillant discrimination information, an experience period of a job of confirming a video, an evaluation of the job performed in the past, a reception history of various trainings relating to a job, a past career, and a previous job performance date. Note that, other information may be included, or some of pieces of the information may not be included. The processing apparatus 10 may automatically update a job experience, an evaluation, and a previous job date. Then, a reception history and a career may be updated based on an input of a surveillant. Note that, when various trainings relating to a job are trainings that can be performed on the web, the processing apparatus 10 may automatically update a reception history as well.

The above-described enterprise being under a contract with a surveillant performs an evaluation, and inputs an evaluation result to the processing apparatus 10. For example, a job at each time may be evaluated with a score between 0.0 to 5.0. Then, an average value of scores at all times may be registered as an evaluation value of each surveillant.

The video distribution unit 14 determines, based on such information of each surveillant, whether a first surveillant being associated with the first terminal apparatus 20 satisfies a surveillant condition of a surveillance target video content determined by the selection information. Then, when the surveillant condition is satisfied (Yes in S42), the video distribution unit 14 distributes the surveillance target video content determined by the selection information to the first terminal apparatus 20 (S43). Note that, the video distribution unit 14 may distribute a surveillance target video content by either one of ways of downloading and streaming.

On the other hand, when the surveillant condition is not satisfied (No in S42), the video distribution unit 14 performs error processing (S44). For example, a message such as "since a surveillant condition is not satisfied, a selected surveillance target video content cannot be confirmed" may be transmitted to the first terminal apparatus 20, and displayed thereon.

Distribution Example 2

Figure 15:
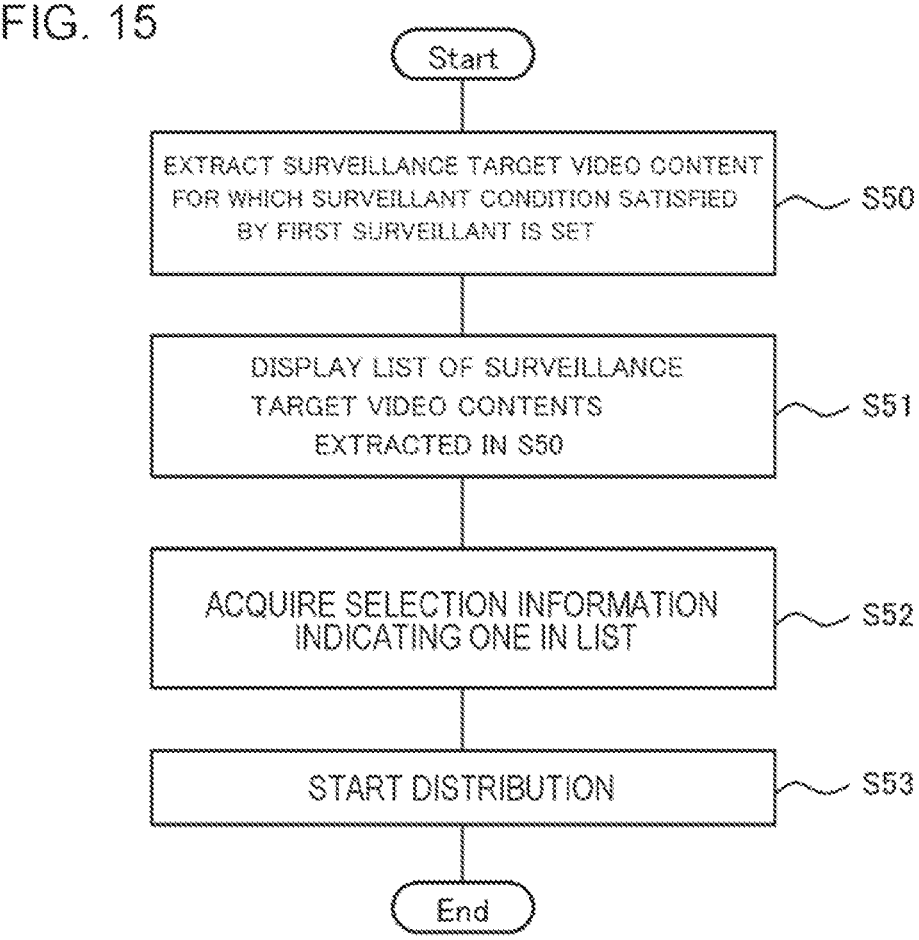
FIG. 15 is a flowchart illustrating one example of a flow of processing of the processing apparatus according to the present example embodiment.

A second example of distributing a surveillance target video content is described by use of a flowchart in FIG. 15.

For example, after a first surveillant operates the first terminal apparatus 20 and logs in the processing apparatus 10, the video distribution unit 14 extracts, from a surveillance target video content needing confirmation work, a surveillance target video content for which a surveillant condition satisfied by the first surveillant is set, based on the above-described information of each of a plurality of surveillants illustrated in FIG. 14 (S50).

Then, as illustrated in FIG. 13, the video distribution unit 14 causes the first terminal apparatus 20 to display a list of surveillance target video contents extracted in S50 (S51). In the example illustrated in FIG. 13, a surveillant condition, an outline (example: a video time or the like) of each content, and a reproduction button for starting confirmation of a video are displayed for each surveillance target video content.

The first surveillant determines, based on an outline of a content, and the like, one surveillance target video content for which confirmation of a video is performed, from the list, and performs an input (example: pressing of the reproduction button) of selecting the surveillance target video content. Accordingly, the first terminal apparatus 20 transmits, to the processing apparatus 10, selection information indicating the selected surveillance target video content.

When receiving the selection information (S52), the video distribution unit 14 distributes a surveillance target video content determined by the selection information to the first terminal apparatus 20 (S53). Note that, the video distribution unit 14 may distribute a surveillance target video content by either one of ways of downloading and streaming.

Note that, in either one of distribution examples 1 and 2, the video distribution unit 14 can acquire, from the terminal apparatus 20, a surveillance report input by a surveillant. For example, when finding an event to be reported to an enterprise in a surveillance target video content, a surveillant performs, to the terminal apparatus 20, an input of generating a surveillance report indicating the event. The terminal apparatus 20 transmits the surveillance report to the processing apparatus 10 at any timing.

A surveillance report may include discrimination information of a surveillance target video content including the event, information (example: an elapsed time from a beginning of a surveillance target video content) indicating a timing at which the event occurs, and the like. For example, a surveillant who has found an event to be reported to an enterprise in a surveillance target video content during reproduction of the surveillance target video content performs a predetermined input to the terminal apparatus 20. Accordingly, the terminal apparatus 20 acquires information (example: an elapsed time from a beginning of a surveillance target video content) indicating a part of the surveillance target video content being screen-displayed at a point when the input is performed, and includes the information in a surveillance report.

Alternatively, the terminal apparatus 20 may accept, from a surveillant, an input indicating a content of an event. Acceptance of the input is achieved by use of any UI component (a checkbox, a textbox, drop-down, or the like).

The video distribution unit 14 causes the storage unit 15 to store the received surveillance report. FIG. 16 schematically illustrates one example of the information stored by the storage unit 15. In the illustrated example, report discrimination information discriminating each of a plurality of surveillance reports, a content of a surveillance report, surveillance discrimination information of a surveillant who has generated each surveillance report, and a date and time (input date and time) when each surveillance report is generated are related to one another.

For example, a member of the above-described enterprise performs work of confirming an event reported by a surveillant, based on the surveillance report. For example, when accepting an input of specifying one surveillance report, the processing apparatus 10 may reproduce a surveillance target video content at a timing when an event indicated by the surveillance report occurs, or several seconds before the timing.

Advantageous Effect

In the surveillance system according to the present example embodiment described above, a surveillant can perform a job of confirming a surveillance target video content, at any timing and in any place. Since a degree of freedom of place and time for performing a job is great in this way, it becomes easy to secure a surveillant.

Moreover, the surveillance system according to the present example embodiment can set a surveillant condition required of a surveillant who confirms each surveillance target video content, and distribute each surveillance target video content to the terminal apparatus 20 of a surveillant satisfying each surveillant condition. Thus, work of confirming each surveillance target video content can be controlled in such a way that an appropriate surveillant performs the work.

Moreover, the surveillance system according to the present example embodiment can generate a surveillance target video content connecting, in a time-series order, parts capturing a person, and distribute the surveillance target video content to a surveillant. Thus, only a part capturing a person can be efficiently confirmed.

Moreover, the surveillance system according to the present example embodiment can generate a surveillance target video content connecting, in a time-series order, parts capturing a person determined as a target requiring surveillance, and distribute the surveillance target video content to a surveillant. Thus, only a part capturing a person determined as a target requiring surveillance can be efficiently confirmed.

Moreover, the surveillance system according to the present example embodiment can generate, for each person, a surveillance target video content connecting, in a time-series order, parts capturing each person, and distribute the surveillance target video content to a surveillant. Thus, only a part capturing each person can be efficiently confirmed. Moreover, since a surveillant may concentratedly confirm one person, a disadvantage of overlooking a suspicious action of the person can be suppressed.

Moreover, the surveillance system according to the present example embodiment can generate, for each person determined as a target requiring surveillance, a surveillance target video content connecting, in a time-series order, parts capturing each person, and distribute the surveillance target video content to a surveillant. Thus, only a part capturing each person determined as a target requiring surveillance can be efficiently confirmed. Moreover, since a surveillant may concentratedly confirm one person, a disadvantage of overlooking a suspicious action of the person can be suppressed.

Second Example Embodiment

A surveillance system according to the present example embodiment differs from that according to the first example embodiment in having a function of surveying whether a surveillant who confirms a video correctly performs a job thereof.

Figure 17:
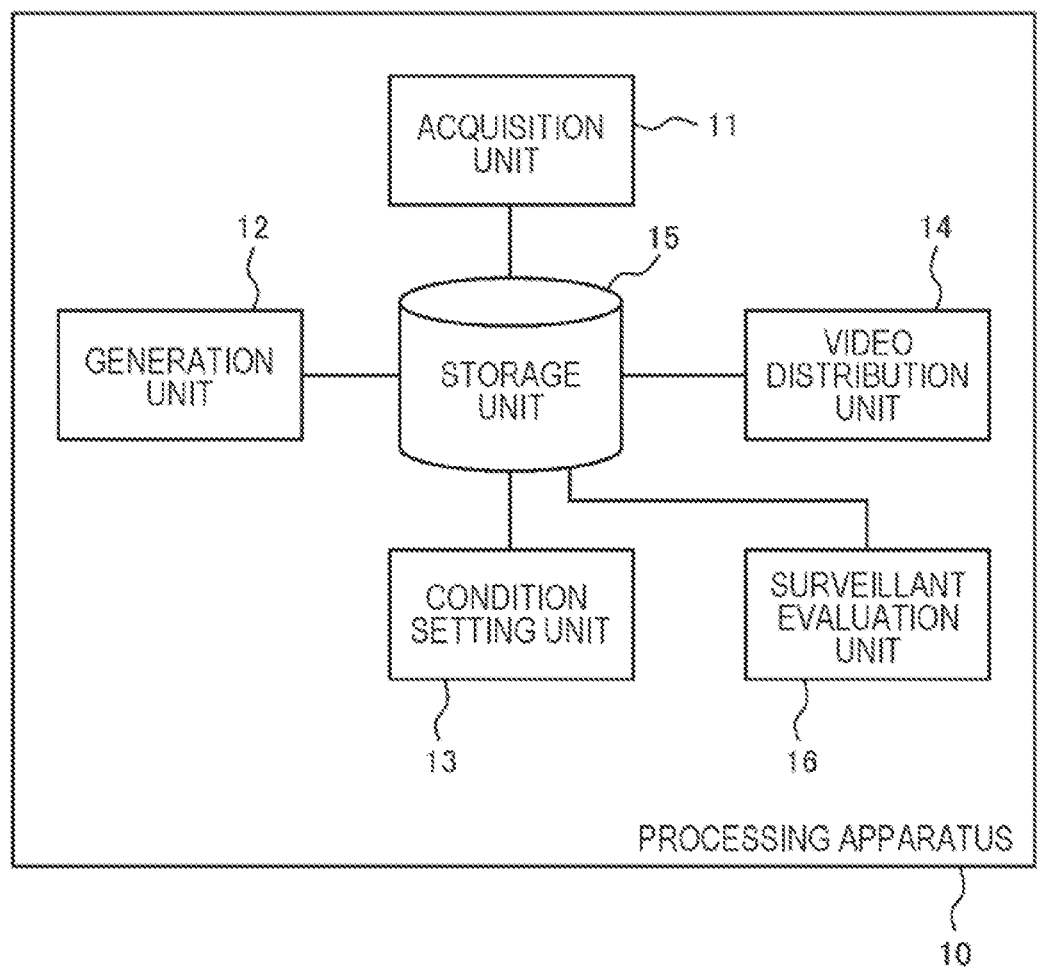
FIG. 17 is one example of a functional block diagram of the processing apparatus according to the present example embodiment.

FIG. 17 illustrates one example of a functional block diagram of a processing apparatus 10. As illustrated, the processing apparatus 10 includes an acquisition unit 11, a generation unit 12, a condition setting unit 13, a video distribution unit 14, a storage unit 15, and a surveillant evaluation unit 16.

The surveillant evaluation unit 16 acquires a surveillant image generated by capturing a surveillant by a terminal apparatus 20 during reproduction of a surveillance target video content. For example, the surveillant evaluation unit 16 may acquire a surveillant image being a video image, or may acquire a surveillant image being a plurality of still images generated by capturing a surveillant every predetermined time (example: every 10 seconds). The surveillant evaluation unit 16 may acquire a surveillant image from the terminal apparatus 20 by real-time processing, or may acquire a surveillant image from the terminal apparatus 20 by batch processing. When acquiring by batch processing, what timing to acquire is a matter of design.

Then, the surveillant evaluation unit 16 analyzes the surveillant image, and evaluates a surveillant. For example, the surveillant evaluation unit 16 may evaluate whether a face of a surveillant is captured in a surveillant image. Moreover, the surveillant evaluation unit 16 may evaluate whether a gaze of a surveillant is directed to a display of the terminal apparatus 20. Then, the surveillant evaluation unit 16 may acquire a surveillant image from the terminal apparatus 20 by real-time processing, and, when performing the evaluation, transmit warning information to the terminal apparatus 20, and output the warning information via an output apparatus (a display, a speaker, or the like), by sensing "a face of a surveillant is not captured in the surveillant image" or "a gaze of the surveillant is not directed to the display of the terminal apparatus 20". The terminal apparatus 20 may output a predetermined warning sound or a voice such as "please perform a job properly" as the warning information from the speaker, may display a sentence such as "please perform a job properly" on the display, or may output other information.

Moreover, the surveillant evaluation unit 16 may compute a time length in which a face of a surveillant is not captured, a time length in which a gaze of the surveillant is not directed to a display of the terminal apparatus 20, or the like. Then, the surveillant evaluation unit 16 may generate surveillant evaluation information indicating the time length, and register the surveillant evaluation information in the storage unit 15. In this case, a price to be paid to the surveillant may be determined in response to the time length. Moreover, the time length may be referred to when the above-described enterprise evaluates a job of the surveillant (when an evaluation illustrated in FIG. 14 is determined).

Moreover, the surveillant evaluation unit 16 may repeatedly acquire biometric information from the terminal apparatus 20, and execute biometric authentication, during a job of confirming a video (surveillance target video content). Thereby, the surveillant evaluation unit 16 senses impersonation in which a person differing from a right surveillant performs the job.

In this case, biometric information of each surveillant is previously stored in the storage unit 15. Then, the surveillant evaluation unit 16 performs biometric authentication by collating biometric information acquired from the terminal apparatus 20 with the biometric information stored in the storage unit 15. The biometric information is exemplified by a face image, an iris, a fingerprint, a voiceprint, and the like, but is not limited thereto.

A timing of performing biometric authentication may be, for example, every predetermined time, may be every time a person moves out of a frame of a surveillant image, or may be another timing.

When succeeding in biometric authentication, the surveillant evaluation unit 16 causes a job of confirming a video to be performed continuously. On the other hand, when failing in biometric authentication, the surveillant evaluation unit 16 transmits, to the terminal apparatus 20, an instruction to stop reproduction of a video. The terminal apparatus 20 stops the reproduction of the video in response to the instruction. Then, the surveillant evaluation unit 16 displays, on the terminal apparatus 20, a message such as "reproduction of a surveillance target video content was stopped due to failure in biometric authentication".

Other components of the surveillance system according to the present example embodiment are similar to those according to the first example embodiment.

The surveillance system according to the present example embodiment described above achieves an advantageous effect similar to that according to the first example embodiment. Moreover, the surveillance system according to the present example embodiment can survey whether a surveillant who confirms a video correctly performs a job thereof. Thus, it is expected that a surveillant correctly performs the job.

Third Example Embodiment

A surveillance system according to the present example embodiment has a function of causing a surveillant to confirm, in real time, a video acquired from a surveillance camera. Note that, the surveillance system according to the present example embodiment may have a function of causing a surveillant to later confirm a video generated by a surveillance camera described in the first example embodiment.

Figure 18:
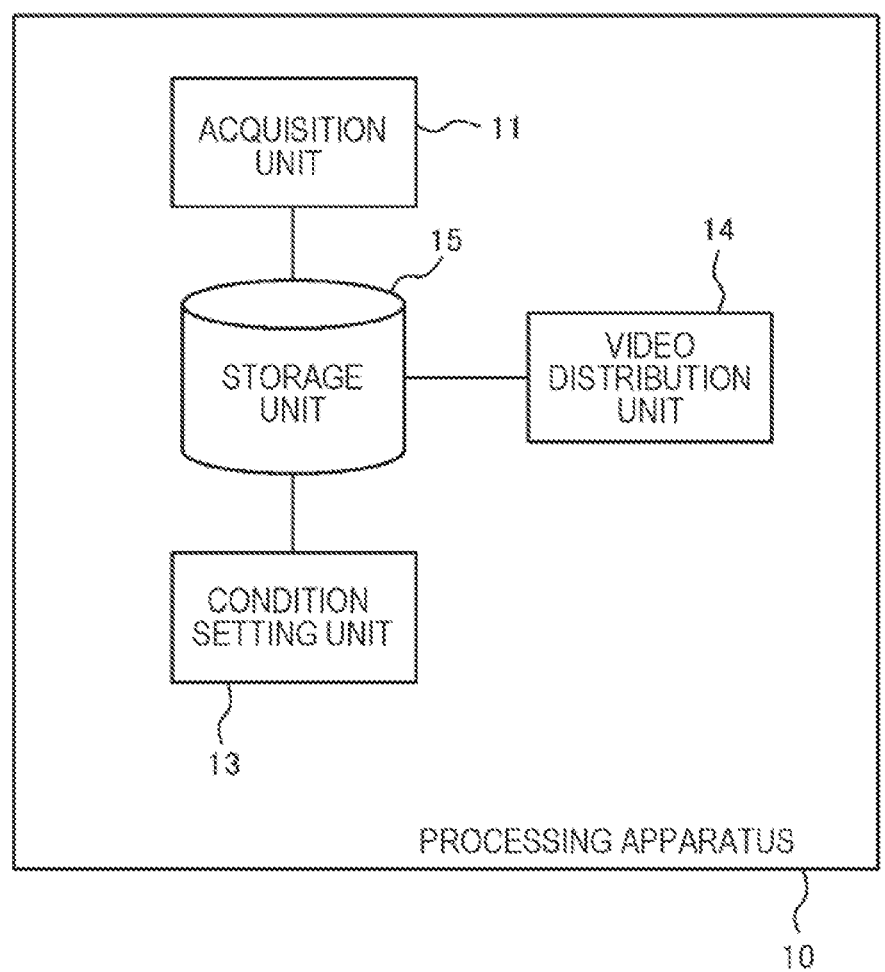
FIG. 18 is one example of a functional block diagram of the processing apparatus according to the present example embodiment.

FIG. 18 illustrates one example of a functional block diagram of a processing apparatus 10. As illustrated, the processing apparatus 10 includes an acquisition unit 11, a condition setting unit 13, a video distribution unit 14, and a storage unit 15. Note that, the processing apparatus 10 may not include the storage unit 15. In this case, another apparatus configured communicably with the processing apparatus 10 includes the storage unit 15. Moreover, the processing apparatus 10 may or may not include a generation unit 12. Moreover, the processing apparatus 10 may or may not include a surveillant evaluation unit 16.

The acquisition unit 11 acquires a video generated by a surveillance camera. A configuration of the acquisition unit 11 is as described in the first example embodiment.

The condition setting unit 13 sets a surveillant condition required of a surveillant who confirms a video. In the present example embodiment, the condition setting unit 13 sets, for each facility, a surveillant condition required of a surveillant who confirms a video generated by a surveillance camera placed at each facility.

For example, as described in the first example embodiment, a person in charge at each facility may previously register a surveillant condition required of a surveillant who confirms a video generated by a surveillance camera of a local facility, as illustrated in FIG. 11. Then, the condition setting unit 13 may set, as in a content of the registration and for each facility, a surveillant condition required of a surveillant who confirms a video generated by a surveillance camera placed at each facility. Note that, as described in the first example embodiment, a person in charge at each facility may be able to register a surveillant condition for each of a plurality of cases.

Note that, the condition setting unit 13 may include a function described in the first example embodiment.

The video distribution unit 14 distributes, in real time, a video generated by the surveillance camera to a terminal apparatus 20 of a surveillant satisfying a surveillant condition.

Distribution Example 1

A first example of distributing, in real time, a video generated by a surveillance camera is described by use of a flowchart in FIG. 12.

Figure 19:
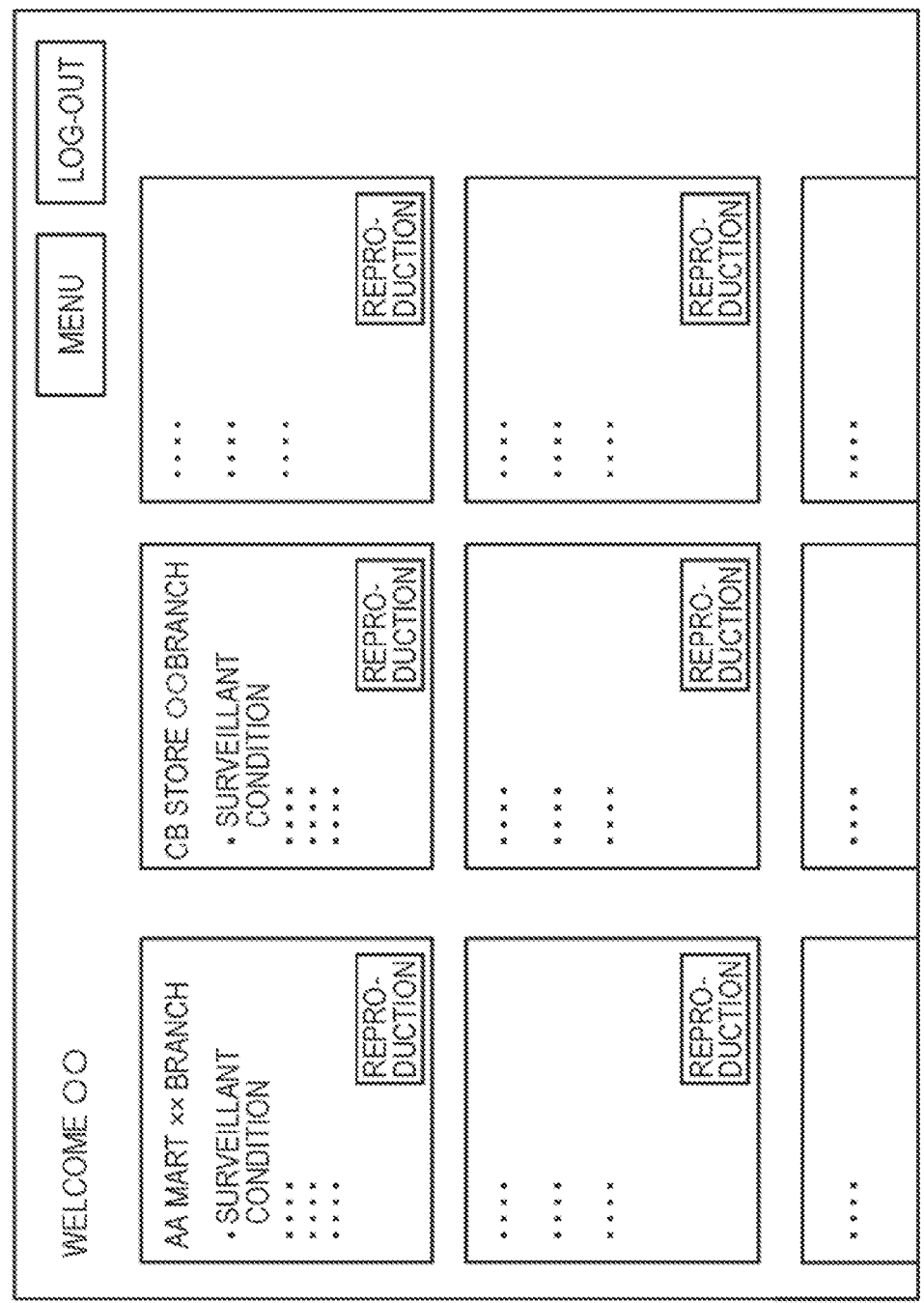
FIG. 19 is a diagram schematically illustrating one example of a screen displayed by the terminal apparatus according to the present example embodiment.

For example, after a first surveillant operates the first terminal apparatus 20 and logs in the processing apparatus 10, the video distribution unit 14 causes the first terminal apparatus 20 to display a list of facilities needing confirmation work of a video, as illustrated in FIG. 19 (S40). In the example illustrated in FIG. 19, a surveillant condition and a reproduction button for starting confirmation of a video are displayed for each facility.

The first surveillant determines, based on a surveillant condition, one facility for which confirmation of a video is performed, from the list, and performs an input (example: pressing of the reproduction button) of selecting the facility. Accordingly, the first terminal apparatus 20 transmits, to the processing apparatus 10, selection information indicating the selected facility.

When acquiring the selection information (S41), the video distribution unit 14 determines whether the first surveillant being associated with the first terminal apparatus 20 satisfies a surveillant condition of a facility determined by the selection information (S42).

For example, as illustrated in FIG. 14, information of each of a plurality of surveillants is previously stored in the storage unit 15. The video distribution unit 14 determines, based on such information of each surveillant, whether a first surveillant being associated with the first terminal apparatus 20 satisfies a surveillant condition of a facility determined by the selection information.

Then, when the surveillant condition is satisfied (Yes in S42), the video distribution unit 14 distributes, in real time, a video generated by a surveillance camera of the facility determined by the selection information to the first terminal apparatus 20 (S43).

On the other hand, when the surveillant condition is not satisfied (No in S42), the video distribution unit 14 performs error processing (S44). For example, a message such as "since a surveillant condition is not satisfied, a video of a selected facility cannot be confirmed" may be transmitted to the first terminal apparatus 20, and displayed thereon.

Distribution Example 2

A second example of distributing, in real time, a video generated by a surveillance camera is described by use of a flowchart in FIG. 15.

For example, after a first surveillant operates the first terminal apparatus 20 and logs in the processing apparatus 10, the video distribution unit 14 extracts, from facilities needing confirmation work of a video, a facility for which a surveillant condition satisfied by the first surveillant is set, based on the above-described information of each of a plurality of surveillants illustrated in FIG. 14 (S50).

Then, as illustrated in FIG. 19, the video distribution unit 14 causes the first terminal apparatus 20 to display a list of facilities extracted in S50 (S51). In the example illustrated in FIG. 19, a surveillant condition and a reproduction button for starting confirmation of a video are displayed for each facility.

The first surveillant determines, from the list, one facility for which confirmation of a video is performed, and performs an input (example: pressing of the reproduction button) of selecting the facility. Accordingly, the first terminal apparatus 20 transmits, to the processing apparatus 10, selection information indicating the selected facility.

When receiving the selection information (S52), the video distribution unit 14 distributes, to the first terminal apparatus 20 in real time, a video generated by a surveillance camera of the facility determined by the selection information (S53).

Note that, in either one of distribution examples 1 and 2, the video distribution unit 14 can acquire, from the terminal apparatus 20, a surveillance report input by a surveillant. Then, the video distribution unit 14 can store the received surveillance report in the storage unit 15. Details thereof are as described in the first example embodiment.

Moreover, in either one of the distribution examples 1 and 2, when a plurality of surveillance cameras are placed in a facility, the video distribution unit 14 can analyze a video generated by a surveillance camera, and switch, based on an analysis result, a video to be distributed to the terminal apparatus 20.

For example, the video distribution unit 14 extracts a person from a video. Then, the video distribution unit 14 determines a surveillant who surveys the extracted person. For example, a plurality of surveillants may simultaneously confirm a video of one facility. Then, when extracting a new person from a video, the video distribution unit 14 determines a surveillant who surveys the newly extracted person, from surveillants confirming a video of the facility at the time.

Thereafter, the video distribution unit 14 extracts the newly extracted person (first person) from a plurality of videos generated by a plurality of surveillance cameras. Then, the video distribution unit 14 can switch, based on an extraction result of the first person, a video to be distributed to the terminal apparatus 20 of a surveillant who surveys the first person, among a plurality of videos generated by a plurality of surveillance cameras.

The video distribution unit 14 can switch a video to be distributed, in such a way as to distribute, to the terminal apparatus 20 of each surveillant, a video capturing a person whom each surveillant is in charge of. For example, while the first person is captured in a video generated by a first surveillance camera, the video distribution unit 14 distributes, in real time, the video generated by the first surveillance camera to the terminal apparatus 20 of a surveillant who surveys the first person. Then, when the first person moves out of a frame of the video generated by the first surveillance camera, and moves into a frame of a video generated by a second surveillance camera, the video distribution unit 14 switches a video to be distributed to the terminal apparatus 20 of a surveillant who surveys the first person, from the video generated by the first surveillance camera to the video generated by the second surveillance camera.

Note that, the video distribution unit 14 may determines whether an extracted person is a target requiring surveillance, and determine a surveillant who surveys a person determined as the target requiring surveillance. In other words, regarding a person who is not determined as a target requiring surveillance, a surveillant who surveys may not be determined. Processing of determining whether a person is a target requiring surveillance is as described in the first example embodiment.

Note that, the video distribution unit 14 may include a function described in the first example embodiment.

Other components of the processing apparatus 10 are similar to those according to the first and second example embodiments.

The surveillance system according to the present example embodiment described above can cause a surveillant to confirm, in real time, a video acquired from a surveillance camera. Then, in such a case as well, an advantageous effect similar to that according to each of the first and second example embodiments is achieved.

Note that, in the present description, "acquisition" includes at least any one of "fetching, by a local apparatus, data stored in another apparatus or a storage medium (active acquisition)", based on a user input, or based on an instruction of a program, for example, receiving by requesting or inquiring of the another apparatus, accessing the another apparatus or the storage medium and reading, and the like, "inputting, into a local apparatus, data output from another apparatus (passive acquisition)", based on a user input, or based on an instruction of a program, for example, while waiting in a state where data transmitted from an external apparatus can be received, receiving data transmitted from the external apparatus, receiving data distributed (or transmitted, push-notified, or the like) from the external apparatus, and selecting and acquiring from received data or information, and "generating new data by editing of data (conversion into text, rearrangement of data, extraction of partial data, alteration of a file format, or the like) or the like, and acquiring the new data".

Modified Example

Another example of a surveillant condition is described. For example, a surveillant condition may be defined based on an evaluation for a surveillance report (see the first example embodiment) generated by a surveillant in the past. In this case, for example, the above-described enterprise being under a contract with a surveillant evaluates each surveillance report generated by a surveillant. For example, each surveillance report may be evaluated with scores between 0.0 to 5.0. Then, an average value of scores of all surveillance reports may be registered as an evaluation value of a surveillance report of each surveillant. In this case, for example, a surveillant condition including "evaluation for a surveillance report: equal to or more than 4.0" or the like can be set.

Moreover, a surveillant condition may be defined based on a number or a frequency at which the surveillant evaluation unit 16 (see the second example embodiment) outputs warning information. In this case, the processing apparatus 10 registers, for each surveillant, an output history of the warning information. Then, the processing apparatus 10 computes, for each surveillant, a number or a frequency at which the warning information is output. In this case, for example, a surveillant condition including "warning information output frequency: equal to or less than three times/hour" or the like can be set.

Moreover, a surveillant condition may be defined based on a time length in which a job of confirming a video has been continuously performed so far. In this case, for example, a surveillant condition including "job continuation time: equal to or less than two hours" or the like can be set.

Some or all of the above-described example embodiments can also be described as, but are not limited to, the following supplementary notes.

1. A processing apparatus including:
   an acquisition means for acquiring a video generated by a surveillance camera;
   a generation means for generating a plurality of surveillance target video contents, based on the video;
   a condition setting means for setting a surveillant condition required of a surveillant who confirms the surveillance target video content; and
   a video distribution means for distributing the surveillance target video content to a terminal apparatus of a surveillant satisfying the surveillant condition.

2. The processing apparatus according to supplementary note 1, wherein
   the generation means extracts a person from the video, and generates the surveillance target video content connecting, in a time-series order, parts capturing a person.

3. The processing apparatus according to supplementary note 2, wherein
   the generation means determines whether an extracted person is a target requiring surveillance, and generates the surveillance target video content connecting, in a time-series order, parts capturing a person determined as a target requiring surveillance.

4. The processing apparatus according to supplementary note 1, wherein
   the generation means extracts a person from the video, and generates a plurality of the surveillance target video contents each connecting, in a time-series order, parts capturing each person for each extracted person.

5. The processing apparatus according to supplementary note 4, wherein
   the acquisition means acquires a plurality of the videos generated by a plurality of the surveillance cameras, and
   the generation means generates, by use of a plurality of the videos, a plurality of the surveillance target video contents each connecting, in a time-series order, parts capturing each extracted person.

6. The processing apparatus according to supplementary note 4 or 5, wherein
   the generation means determines whether an extracted person is a target requiring surveillance, and generates the surveillance target video content for each person determined as a target requiring surveillance.

7. The processing apparatus according to any one of supplementary notes 1 to 6, wherein
   the video distribution means
   causes a first terminal apparatus to display a list of the surveillance target video contents,
   receives, from the first terminal apparatus, selection information indicating one in the list,
   determines whether a surveillant being associated with the first terminal apparatus satisfies the surveillant condition of the surveillance target video content determined by the selection information, and,
   when the surveillant condition is satisfied, distributes the surveillance target video content determined by the selection information to the first terminal apparatus.

8. The processing apparatus according to any one of supplementary notes 1 to 6, wherein
   the video distribution means
   causes the first terminal apparatus to display a list of the surveillance target video contents for which the surveillant condition satisfied by a surveillant being associated with a first terminal apparatus is set,
   receives, from the first terminal apparatus, selection information indicating one in the list, and
   distributes the surveillance target video content determined by the selection information to the first terminal apparatus.

9. A processing apparatus including:
   an acquisition means for acquiring a video generated by a surveillance camera;

a condition setting means for setting a surveillant condition required of a surveillant who confirms the video; and a video distribution means for distributing the video to a terminal apparatus of a surveillant satisfying the surveillant condition.

10. The processing apparatus according to supplementary note 9, wherein the acquisition means acquires a plurality of the videos generated by a plurality of the surveillance cameras, and the video distribution means extracts a person from the video, determines a surveillant who surveys an extracted person, and distributes the video capturing an extracted person to the terminal apparatus of a determined surveillant.

11. The processing apparatus according to supplementary note 10, wherein the video distribution means determines whether an extracted person is a target requiring surveillance, and determines a surveillant who surveys a person determined as a target requiring surveillance.

12. The processing apparatus according to supplementary note 10 or 11, wherein the video distribution means
extracts a first person from a plurality of the videos generated by a plurality of the surveillance cameras, and
switches, based on an extraction result of the first person, the video to be distributed to the terminal apparatus of a surveillant who surveys the first person, among a plurality of the videos generated by a plurality of the surveillance cameras.

13. The processing apparatus according to any one of supplementary notes 1 to 12, wherein the video distribution means acquires, from the terminal apparatus, a surveillance report input by a surveillant.

14. The processing apparatus according to any one of supplementary notes 1 to 13, wherein the surveillant condition is defined based on at least one of an experience of a job of confirming a video, an evaluation of the job performed in a past, whether various trainings relating to the job are received, a past career, and an elapsed time from a previous job performance date.

15. The processing apparatus according to any one of supplementary notes 1 to 14, wherein the condition setting means sets the surveillant condition, based on at least one of a characteristic of a person captured in a video, a capturing time period of a video, and a capturing place of a video.

16. The processing apparatus according to any one of supplementary notes 1 to 15, further including a surveillant evaluation means for analyzing a surveillant image generated by capturing a surveillant by the terminal apparatus, and evaluating the surveillant.

17. The processing apparatus according to any one of supplementary notes 1 to 16, further including a surveillant evaluation means for repeatedly acquiring biometric information from the terminal apparatus, and executing biometric authentication, during a job of confirming a video.

18. A processing method including:
by a computer,
acquiring a video generated by a surveillance camera;
generating a plurality of surveillance target video contents, based on the video;
setting a surveillant condition required of a surveillant who confirms the surveillance target video content; and
distributing the surveillance target video content to a terminal apparatus of a surveillant satisfying the surveillant condition.

19. A program causing a computer to function as:
an acquisition means for acquiring a video generated by a surveillance camera,
a generation means for generating a plurality of surveillance target video contents, based on the video,
a condition setting means for setting a surveillant condition required of a surveillant who confirms the surveillance target video content, and
a video distribution means for distributing the surveillance target video content to a terminal apparatus of a surveillant satisfying the surveillant condition.

20. A processing method including:
by a computer,
acquiring a video generated by a surveillance camera;
setting a surveillant condition required of a surveillant who confirms the video; and
distributing the video to a terminal apparatus of a surveillant satisfying the surveillant condition.

21. A program causing a computer to function as:
an acquisition means for acquiring a video generated by a surveillance camera,
a condition setting means for setting a surveillant condition required of a surveillant who confirms the video, and
a video distribution means for distributing the video to a terminal apparatus of a surveillant satisfying the surveillant condition.

22. A processing system including:
acquiring a video generated by a surveillance camera;
generating a plurality of surveillance target video contents, based on the video;
setting a surveillant condition required of a surveillant who confirms the surveillance target video content; and
distributing the surveillance target video content to a terminal apparatus of a surveillant satisfying the surveillant condition.

While the invention of the present application has been described above with reference to the example embodiments (and examples), the invention of the present application is not limited to the example embodiments (and examples) described above. Various modifications understandable to a person skilled in the art can be made to a configuration and details of the invention of the present application within the scope of the invention of the present application.

This application is based upon and claims the benefit of priority from Japanese patent application No. 2019-157915, filed on Aug. 30, 2019, the disclosure of which is incorporated herein in its entirety by reference.

REFERENCE SIGNS LIST

1A Processor
2A Memory
3A Input/output interface
4A Peripheral circuit
5A Bus
10 Processing apparatus
11 Acquisition unit 12 Generation unit
13 Condition setting unit
14 Video distribution unit
15 Storage unit
16 Surveillant evaluation unit
20 Terminal apparatus
30 Communication network

What is claimed is:

1. A processing apparatus comprising:
at least one memory configured to store one or more instructions; and
at least one processor configured to execute the one or more instructions to:
acquire a video generated by a surveillance camera;
generate, based on the video, a plurality of surveillance target video content, each of the plurality of surveillance target video content generated by extracting a plurality of video segments comprising a target subject from the video and connecting the plurality of video segments in a time-series order;
set a surveillant condition for each of the plurality of surveillance target video content, the surveillant condition defining an attribute about a candidate surveillant capable of confirming the respective surveillance target video content; and
distribute a first surveillance target video content, among the plurality of surveillance target video content, to a first terminal apparatus of a first surveillant satisfying a first surveillant condition set for the first surveillance target video content,
wherein the surveillant condition is defined based on at least one of an experience of a job of confirming a video, an evaluation of the job performed in a past, whether various trainings relating to the job are received, a past career, and an elapsed time from a previous job performance date; and
wherein the at least one processor is further configured to execute the one or more instructions to:
extract persons from the video,
determine surveillants among a plurality of surveillants, each of the determined surveillants being in charge of surveying each of the extracted persons, and
distribute the surveillance target video content, each of the surveillance target video content including scenes capturing each of the extracted persons, and each of the surveillance target video content being distributed to each of terminal apparatuses of the determined surveillants.

2. The processing apparatus according to claim 1, wherein the target subject is a person from the video.

3. The processing apparatus according to claim 2, wherein the at least one processor is further configured to execute the one or more instructions to determine whether the target subject is target requiring surveillance.

4. The processing apparatus according to claim 1, wherein the at least one processor is further configured to execute the one or more instructions to:
acquire a plurality of videos generated by a plurality of surveillance cameras, and
generate plurality of surveillance target video content based on the plurality of the videos.

5. The processing apparatus according to claim 1, wherein each of the plurality of surveillance target video content corresponds to a different target subject.

6. The processing apparatus according to claim 1, wherein the at least one processor is further configured to execute the one or more instructions to:
cause the first terminal apparatus to display a list of the plurality of surveillance target video content,
receive, from the first terminal apparatus, selection information indicating one of the plurality of surveillance target video content in the list,
determine whether the first surveillant associated with the first terminal apparatus satisfies the first surveillant condition of the first surveillance target video content identified by the selection information, and,
based on the first surveillant condition being satisfied, distribute the first surveillance target video content identified by the selection information to the first terminal apparatus.

7. The processing apparatus according to claim 1, wherein the at least one processor is further configured to execute the one or more instructions to:
cause the first terminal apparatus to display a list of one or more first surveillance target video content, among the plurality of surveillance target video content, each of the one or more first surveillance target video content set with the first surveillant condition, which matches the first surveillant associated with the first terminal apparatus,
receive, from the first terminal apparatus, selection information indicating one of the one or more first surveillance target video content in the list, and
distribute the first surveillance target video content identified by the selection information to the first terminal apparatus.

8. The processing apparatus according to claim 1, wherein the at least one processor is further configured to execute the one or more instructions to acquire, from the first terminal apparatus, a surveillance report input by the first surveillant.

9. The processing apparatus according to claim 1, wherein the at least one processor is further configured to execute the one or more instructions to set the surveillant condition, based on at least one of a characteristic of a person captured in a video, a capturing time period of a video, and a capturing place of a video.

10. The processing apparatus according to claim 1, wherein the at least one processor is further configured to execute the one or more instructions to analyze a surveillant image generated by capturing the first surveillant by the first terminal apparatus, and evaluate the first surveillant.

11. The processing apparatus according to claim 1, wherein the at least one processor is further configured to execute the one or more instructions to repeatedly acquire biometric information from the first terminal apparatus, and execute biometric authentication, during a job of confirming a video.

12. A processing apparatus comprising:
at least one memory configured to store one or more instructions; and
at least one processor configured to execute the one or more instructions to:
acquire a plurality of videos, each generated by a surveillance camera located at a facility among a plurality of facilities; set a surveillant condition for each of the plurality of videos based on the facility from which the respective video is acquired, the surveillant condition defining an attribute about a candidate surveillant capable of confirming the respective video from one of the plurality of facilities; and distribute a first video, among the plurality of videos, to a terminal apparatus of a first surveillant satisfying a first surveillant condition set for the first video from a first facility, wherein the surveillant condition is defined based on at least one of an experience of a job of confirming a video, an evaluation of the job performed in a past, whether various trainings relating to the job are received, a past career, and an elapsed time from a previous job performance date; and wherein the at least one processor is further configured to execute the one or more instructions to:

extract persons from the video, determine surveillants among a plurality of surveillants, each of the determined surveillants being in charge of surveying each of the extracted persons, and distribute the surveillance target video content, each of the surveillance target video content including scenes capturing each of the extracted persons, and each of the surveillance target video content being distributed to each of terminal apparatuses of the determined surveillants.

13. The processing apparatus according to claim 12, wherein the at least one processor is further configured to execute the one or more instructions to:

extract a person from the video, determine a surveillant who surveys an extracted person, and distribute the video capturing an extracted person to the terminal apparatus of a determined surveillant.

14. The processing apparatus according to claim 13, wherein the at least one processor is further configured to execute the one or more instructions to determine whether an extracted person is a target requiring surveillance, and determine a surveillant who surveys a person determined as a target requiring surveillance.

15. The processing apparatus according to claim 13, wherein the at least one processor is further configured to execute the one or more instructions to:

extract a first person from the of the videos, and switch, based on an extraction result corresponding to the first person, from distributing the first video to distributing a second video.

16. A processing method performed by computer comprising:

acquiring a video generated by a surveillance camera;

generating, based on the video, a plurality of surveillance target video content, each of the plurality of surveillance target video content generated by extracting a plurality of video segments comprising a target subject from the video and connecting the plurality of video segments in a time-series order;

setting a surveillant condition for each of the plurality of surveillance target video content, the surveillant condition defining an attribute about a candidate surveillant capable of confirming the respective surveillance target video content; and distributing a first surveillance target video content, among the plurality of surveillance target video content, to a first terminal apparatus of a first surveillant satisfying a first surveillant condition set for the first surveillance target video content, wherein the surveillant condition is defined based on at least one of an experience of a job of confirming a video, an evaluation of the job performed in a past, whether various trainings relating to the job are received, a past career, and an elapsed time from a previous job performance date;

wherein the method further comprises:

extracting persons from the video, determining surveillants among a plurality of surveillants, each of the determined surveillants being in charge of surveying each of the extracted persons, and distributing the surveillance target video content, each of the surveillance target video content including scenes capturing each of the extracted persons, and each of the surveillance target video content being distributed to each of terminal apparatuses of the determined surveillants.

* * * * *